Aug. 16, 1966     A. C. SAMPIETRO ETAL     3,266,591
MILITARY VEHICLE
Filed July 17, 1963     5 Sheets-Sheet 1
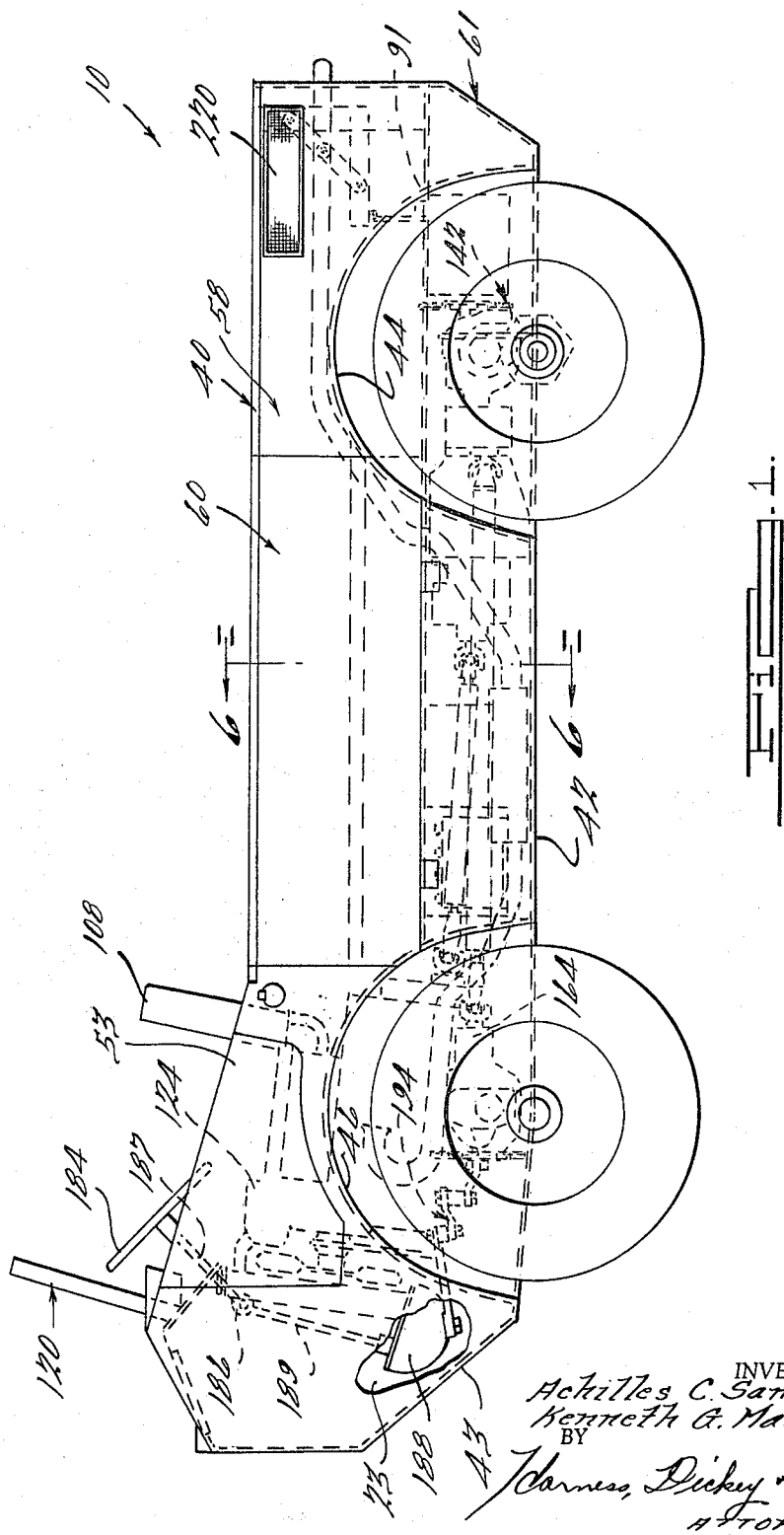
INVENTORS
Achilles C. Sampietro
Kenneth G. Matthews
BY
Harness, Dickey & Pierce
ATTORNEYS

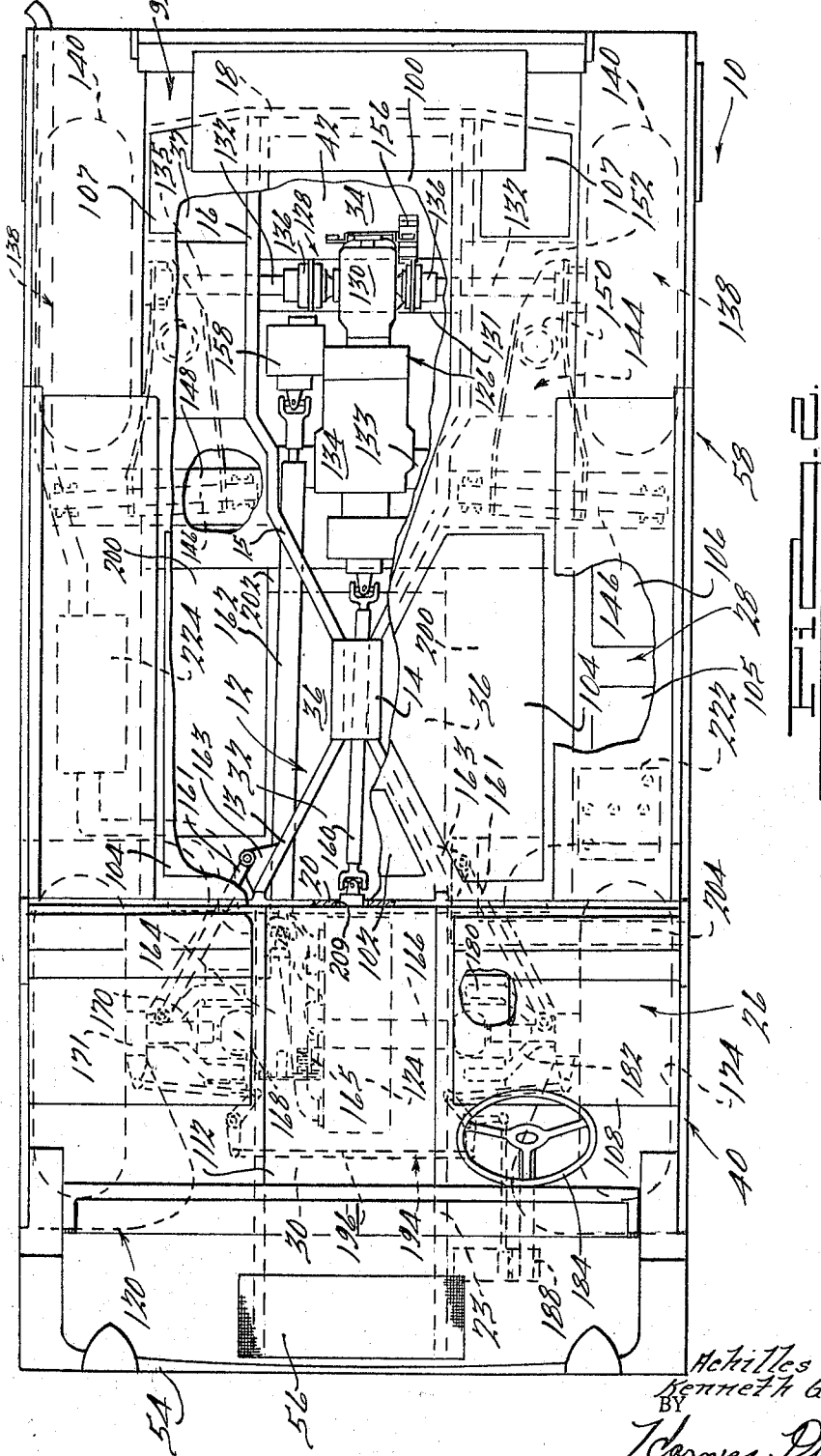

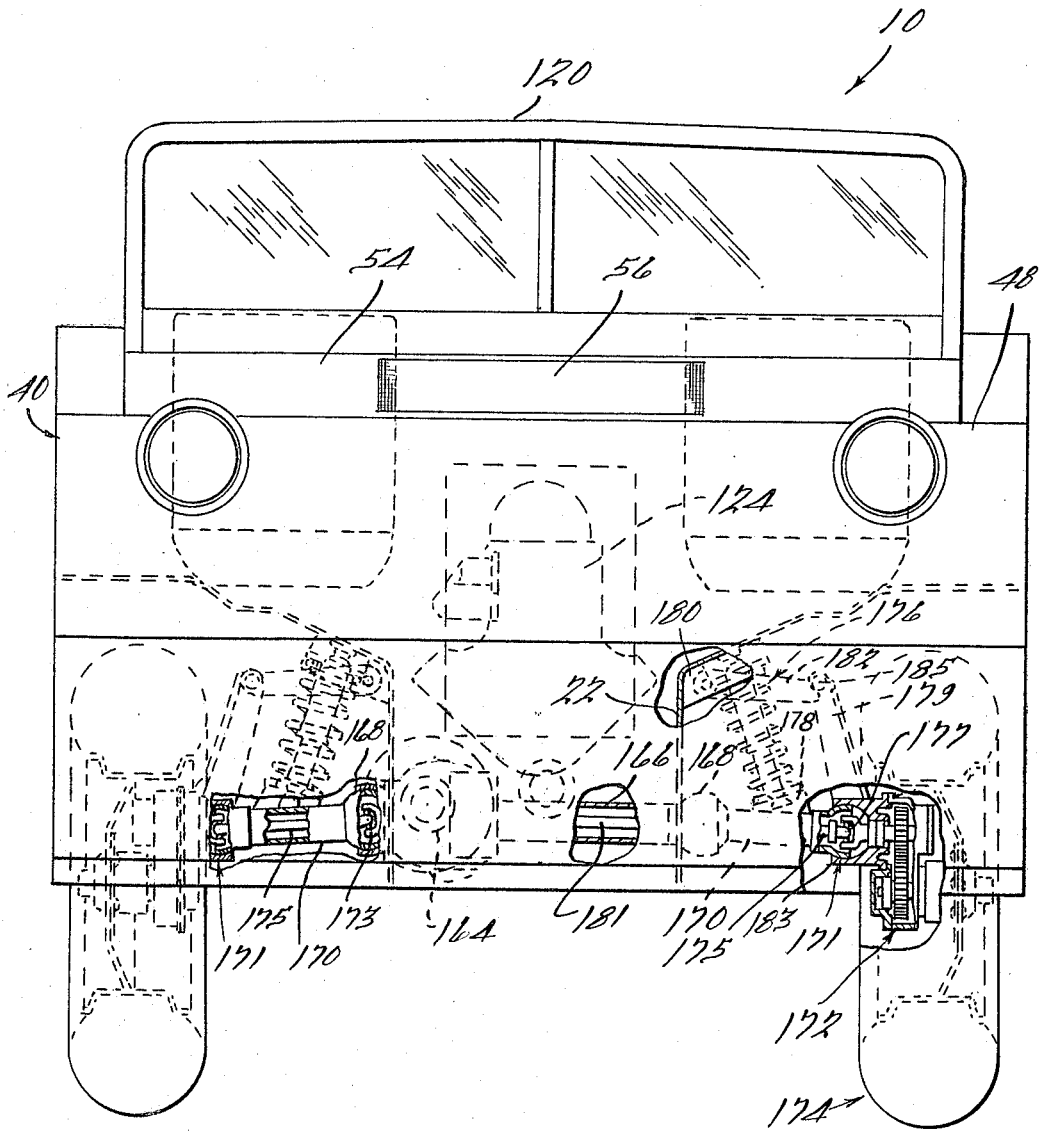

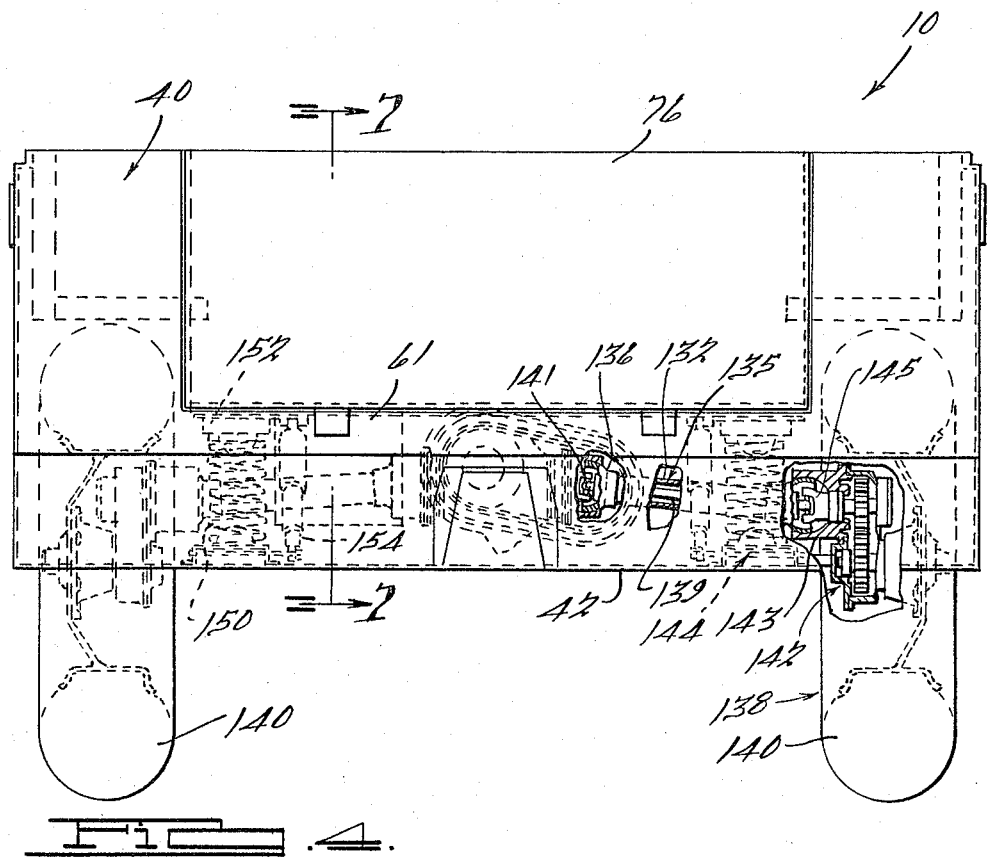
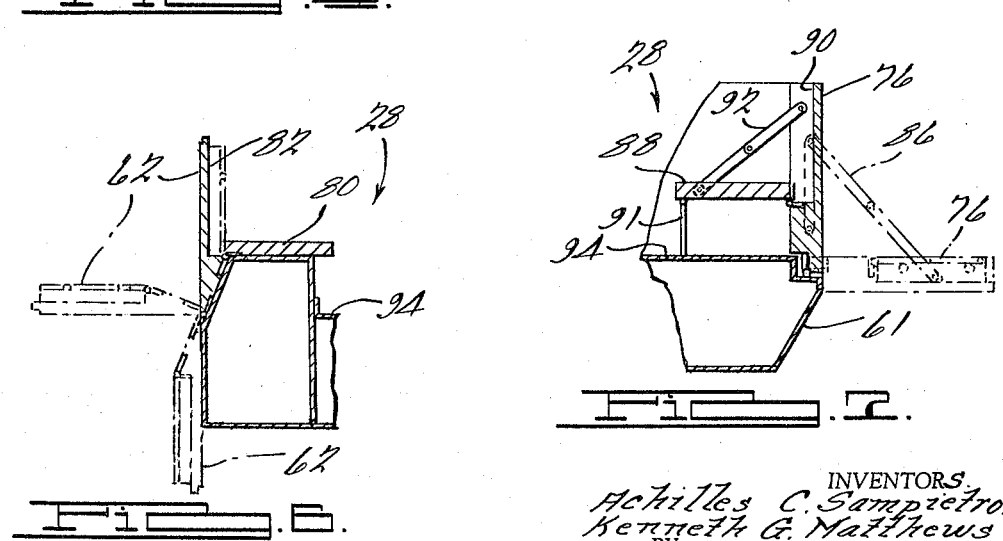

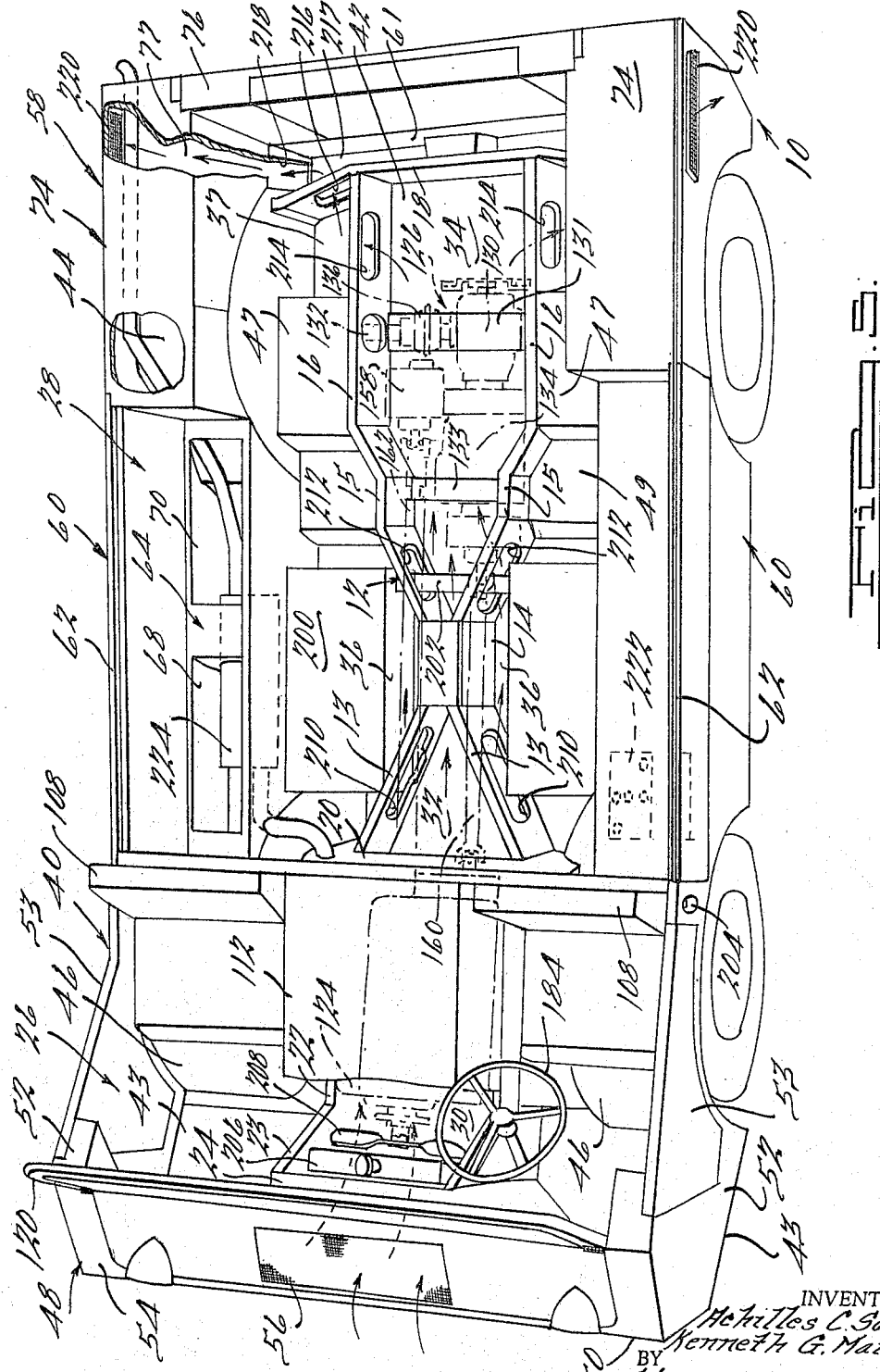

3,266,591
MILITARY VEHICLE
Achilles C. Sampietro, Bloomfield Hills, and Kenneth G. Matthews, Grosse Pointe Woods, Mich., assignors to Kaiser Jeep Corporation, Toledo, Ohio, a corporation of Nevada
Filed July 17, 1963, Ser. No. 295,634
19 Claims. (Cl. 180—54)

This invention relates to motor vehicles, and more particularly to motor vehicles of the amphibious type.

The vehicle of the present invention is floatable and has an outer shell and has the engine, transmission, and drive line components located in compartments within the outer shell. Each compartment is readily accessible from within the outer shell thereby facilitating repair of these components. The vehicle of the present invention is provided with a cooling and ventilation system which cools not only the engine but also the transmission, clutch, brakes, etc., and, in addition, provides means for maintaining the compartments dry, thereby preventing corrosion in these compartments.

Since the vehicle of this invention is to be used both on water and on land, it is important that proper weight distribution be maintained. Thus, in the present invention, the engine is located near the front of the vehicle and the transmission, transfer case and clutch assembly are located towards the rear of the vehicle to thereby provide a desired balance such that the vehicle when in the water will ride with the front and rear substantially evenly. It is likewise equally important that the weight be evenly distributed on opposite sides of the vehicle to prevent rolling to one side when in the water.

The vehicle of the present invention has a rear load carrying area which can accommodate passengers or cargo. This rear area is provided with access gates to facilitate loading and unloading.

It is an object of this invention to provide a floatable vehicle having an outer shell having readily accessible compartments therein in which the engine and drive line components are located.

It is another object of this invention to provide a floatable vehicle having an outer shell in which are located the engine and drive line components and which has means for ventilating the engine and drive line components.

It is a further object of this invention to provide a floatable vehicle having an outer shell and having the engine and drive line components located in compartments therein and further including means for cooling the engine, transmission and drive line components and for ventilating the compartments in which they are located.

It is still another object of this invention to provide a floatable, amphibious vehicle in which the weight is substantially equally distributed fore and aft.

It is still another object of this invention to provide an amphibious vehicle in which the weight is substantially equally distributed on opposite sides thereof.

It is still another object of this invention to provide a vehicle having a load carrying area and having means therein to facilitate loading and unloading thereof.

It is an object of this invention to provide an amphibious vehicle having a novel body construction.

Other objects, features, and advantages of the present invention will become apparent from the subsequent description, taken in conjunction with the accompanying drawings, in which:

FIGURE 1 is a side elevational view of a preferred embodiment of an amphibious vehicle depicting features of the present invention;

FIG. 2 is a top elevational view, with some parts broken away, of the vehicle of FIGURE 1;

FIG. 3 is a front elevational view of the vehicle of FIGURE 1 with some parts broken away and others shown in section;

FIG. 4 is a rear elevational view of the vehicle of FIGURE 1 with some parts broken away and others shown in section;

FIG. 5 is a pictorial representation, with some parts shown broken away, with some parts removed, and with some parts shown in section, of the vehicle of FIGURE 1;

FIG. 6 is a cross-sectional view of the side gate of the vehicle of FIGURE 1 taken substantially along the line 6—6 in FIGURE 1, with alternate positions of the side gate shown in phantom; and FIG. 7 is a cross-sectional view of the tail gate of the vehicle of FIGURE 1 taken substantially along the line 7—7 in FIGURE 4, with an alternate position of the tail gate shown in phantom.

The body of the vehicle of the present invention is of a unitized construction and has essentially two types of members, structural members and skin members. In this design substantially all of the loads are borne by or applied to the structural members while the skin members are substantially non-load-carrying sheet metal panels, the primary function of which is to enclose the body and to enable floatation. The body is lightweight since the skin members can be made of a considerably lighter gauge than the structural members.

Looking now to the drawings, a vehicle embodying the features of this invention is generally indicated by the number 10 and has a longitudinally extending body which has structural means for substantially carrying the loads on the vehicle comprising a generally longitudinally extending X-shaped frame assembly 12 (FIGURES 2 and 5). The assembly 12 has a forward pair of diverging legs 13 and a rearward pair of diverging legs 15 which are joined at a common open box section 14. The rear diverging legs 15 have at their ends parallelly rearwardly extending leg portions 16 which are connected at their rearward extremities by a transversely extending rear cross member 18. The forward diverging legs 13 are connected at their forward extremities by a transversely extending intermediate cross member 20. A pair of parallel legs 22 extend forwardly from the intermediate cross member 20 and terminate in an upwardly inclined portion 23 at the forward end of the vehicle 10 with their forward extremities connected by a front cross member 24. The individual members of the frame assembly 12 can be either of a box or channel construction. The structural means, in addition to assembly 12, includes components to be described.

The intermediate cross member 20 divides the vehicle 10 into a front section 26 and a rear section 28. In addition, the X-shaped frame assembly 12, along with other components to be described, can be considered to define a front compartment 30, an intermediate compartment 32, a rear compartment 34, and a pair of oppositely disposed side compartments 36. The front compartment 30 is substantially defined by the front legs 22, leg portions 23 and intermediate cross member 20; the intermediate compartment 32 is substantially defined by the intermediate cross member 20 and legs 13; the rear compartment 34 is substantially defined by legs 15, leg portions 16 and rear cross member 18; and the side compartments 36 are substantially defined by those of legs 13 and 15 on the same side of vehicle 10. The purpose of the sections 26, 28 and compartments 30-36 will be readily seen from the description which follows.

The vehicle 10 further includes an outer shell or hull assembly generally indicated by the numeral 40. The outer shell assembly 40 has a lower skin or bottom member 42 which extends substantially co-extensively, longitudinally with the assembly 12 and which extends transversely outwardly therefrom. The bottom member 42 is located generally underneath the assembly 12 and is generally flat and extends upwardly at its forward end 43 to follow the contour of inclined portion 23 of legs 22. The lower skin member 42 is spot welded or otherwise secured to the underside of frame assembly 12. A pair of rear wheel wells 44 are defined by the skin member 42 on opposite transverse sides of the rear compartment 34; similarly, a pair of forward wheel wells 46 are defined by the skin member 42 substantially on opposite transverse sides of the front compartment 30. The wheel wells 44 and 46 are of a conventional construction with each defining a generally semi-circular cross section. The intermediate cross member 20 is attached at its opposite transverse ends to that portion of the lower skin member 42 defining the front wheel wells 46. The rear cross member 18 has its transverse end portions connected to that portion of the lower skin member 42 which defines the rear wheel wells 44. The lower skin member 42 has upwardly stepped portions 47 which are located adjacent the rear wheel wells 44 and in engagement with a portion of the leg portions 16. The stepped portion 47 provides clearance for the rear axle housing in a manner to be seen. Adjacent portion 47 are upwardly intermediate stepped portions 49 which provide ground clearance for the supports for the rear suspension trailing arms to be described. The leg portions 16, the stepped portions 47 and rear cross member 18 define rear side compartments 37 which can be used for storage.

The forward section 26 is substantially peripherally enclosed by a front end sheet metal assembly, generally indicated by the numeral 48, including a generally vertically upwardly extending flat frontal portion 50 and generally vertically extending side portions 52 disposed at opposite transverse extremities of the frontal portion 50. The side portions 52 extend rearwardly to the intermediate cross member 20 and are cut out to follow the contour of the front wheel wells 46 of the bottom member 42. The front sheet metal assembly 48 is welded or otherwise secured to the forward extremities of the bottom member 42 to provide a water-tight joint therewith. Doors 53 are provided in the side portions 52 and are hinged to swing outwardly therefrom; a water-tight seal is provided between the doors 53 and the corresponding openings in the side portions 52.

A grill section 54 is secured to the forward portion 50 and extends rearwardly therefrom and is angulated relative to the horizontal and has disposed substantially centrally therein a grill 56 which serves a purpose to be seen.

A windshield assembly 120 is hinged at its lower end to the grill section 54 of the front end sheet metal assembly 48. The windshield assembly can be pivoted to an upright position (FIGURES 1, 3 and 5) or, alternatively, to a downward position against the grill section 54 to thus lower the total height of the vehicle 10.

The rear section 28 is peripherally enclosed by means of a rear sheet metal assembly generally indicated by the numeral 58. The rear sheet metal assembly 58 includes a pair of side panels 60 disposed on opposite transverse sides of the vehicle and extending substantially vertically upwardly and extending rearwardly from the intermediate cross member 20 to the rear of the vehicle 10. The side panels 60 are interconnected at their rearward extremities by an upwardly extending rear panel 61. The side panels 60 and rear panel 61 are connected by welding or other means to the bottom member 42 in a manner to form a fluid-tight connection therewith.

Thus, the front end sheet metal assembly 48, the side panels 60, the rear panel 61, and the bottom member 42 define a water-tight, floatable hull or body.

A side gate 62, of a construction to be described, is located at the top of each side panel 60 and opens outwardly relative to the vehicle 10 to facilitate loading and unloading of the rear section 28. A water-tight seal is provided between the side gates 62 and the corresponding openings in the panels 60.

A pair of enclosure assemblies 64 comprised of vertically and horizontally extending members are located in side compartments 36 and extend between the front and rear wheel wells 46 and 44 and adjacent side panels 60 and have openings in the top whereby storage compartments 68 and 70 are defined. Each assembly 64 extends upwardly beyond the components of the frame assembly 12 and provides support for side seats in a manner to be seen.

Each side assembly 60 has a rear portion 74, comprised of vertically and horizontally extending members, which is mateably secured to the rearward portion of that part of bottom 42 defining rear wheel housing 44 to enclose therewith a volume or passageway 77 which serves a purpose to be described.

The rearward extremity of the portion 74 and the rear panel 61 are formed to define an opening which receives a rear tailgate 76 which swings rearwardly downwardly to thereby facilitate loading and unloading of the rear section 28 of the vehicle 10. The tailgate 76 and its corresponding opening are provided with water-tight joints.

Looking now to FIGURE 6, the side gate 62, for each side, has a hinged connection for pivotal movement outwardly from the vehicle as indicated by the phantom representation. The gate 62 includes a seat member 80 which fits within a recess 82 and which is hinged therein at its lower extremity and is pivotable downwardly and inwardly relative to the vehicle 10 to provide a seat. The enclosure assemblies 64 extend upwardly proximate to the seat members 80 and act as supports therefor.

Looking now to FIGURE 7, the tailgate 76 is hinged at its lower extremity and is pivotable downwardly and rearwardly relative to the vehicle 10 and is further connected to the side panels 60 by a strap type link 86 whereby the position of the tailgate is maintained substantially horizontally, as shown by the phantom lines in FIGURE 7, to thereby facilitate loading and unloading of the rear section 28 of the vehicle 10. A seat member 88 is locatable within a recess 90 in the inner surface of the tailgate 76 and is hinged at its lower extremity whereby, with the tailgate 76 in its upright or closed position, the seat member 88 can be pivoted downwardly and inwardly relative to the vehicle to form a seat. The seat member 88 has a support member 91 which is pivotable downwardly to support the seat member 88. A strap type linkage 92 connects seat 88 to tailgate 76 and additionally supports the seat member 88.

A floor assembly 94 is located within the rear section 28 of the vehicle 10 and is disposed on top of the structural assembly 12; thus, the compartments 32, 34, 36 and 37 are substantially enclosed. The floor member 94 is provided with an access door 100 for the rear compartment 34, an access door 102 for the intermediate compartment 32 and a pair of access doors 104 for side compartments 36; in addition, a pair of access doors 105, 106 are provided for storage areas 68 and 70 respectively, and access doors 107 are provided for the rear side compartments 37. These access doors are removable and provide means for access to the various compartments for purposes to be presently understood.

The front compartment 30 is provided with a generally U-shaped access cover 112 which is hinged at its rearward end to the intermediate cross member 20; the forward compartment 30 and its cover 112 split the front section 26 into two seating areas, each of which is provided with a seat 108 located upon the front wheel wall 46.

An internal combustion engine or other suitable type power plant is generally indicated by the numeral 124 and is located within the compartment 30 and is supported by the structural legs 22. The cover 112 readily permits access to the engine 124 for maintenance, replacement, etc.

A transmission and rear axle assembly 126 is located in the rear compartment 34 and comprises a rear axle subassembly 128 and a transmission subassembly 134. The rear axle subassembly 128 includes a differential 130 and a pair of transversely extending rear axle arms 132. The differential 130 which is driven by the transmission 134 provides power to the axle shafts of the rear axle arms 132. Since the transmission 134 and differential 130 can be constructed in accordance with means well known in the art and since the specific construction thereof in no way constitute a part of the present invention, the specific details thereof have not been shown. The transmission 134 is preferably automatic to thereby eliminate the need for shift linkages.

A pair of support members 131 and 133 extend transversely between and are connected to portions 16 and legs 15 respectively. The support 131 supports the assembly 126 at the differential 130 while support 133 supports assembly 126 at the transmission 134. The rear axle arms 132 extend transversely outwardly from opposite sides of the differential 130 and through elongated openings in leg portions 16. The axle arms 132 include housing members 135 which are pivotably connected to the differential 130 for up and down swinging motion by means of pivot joints 136. Clearance with the body of vehicle 10 for this up and down swinging motion is provided by the stepped portion 47 in the bottom member 42. The joint 136 can be a ball and socket joint or some other suitable type. Axle shafts 139 for housings 135 are provided with universal joints 141 within pivot joint 136 which also permit up and down swinging motion along with rotation. The axle shafts 139 are, of course, driven by the differential 130 in the conventional manner.

A rear wheel assembly 138 is connected to the outer end of each of the axle arms 132 and includes a wheel member 140 which is driven by a drop gear assembly 142. The housing of the drop gear assembly 142 is connected to the outer extremity of the axle housing 135 by means of a pivot joint 143, which can be of the ball and socket type. The gears of assembly 142 are connected by a spindle and universal joint assembly 145 to axle shaft 139, with the universal joint being located centrally within the pivot joint 143.

The arms 132 of the rear axle subassembly 128 act as upper control or guide arms for the rear wheel assemblies 138. For the lower control arm for each wheel assembly 138, a trailing arm assembly 144 is used and has its rearward end pivotally fixed to the housing of the drop gear assembly 142 and is pivotally held at its forward end by means of a pivot shaft subassembly 146 which is secured to the vehicle 10 by means of a support bracket 148. The support bracket 148 is fixed to one of the rearward legs 15, to the frame assembly 12 and to the bottom surface of the bottom member 42 and extends transversely outwardly. The bracket 148 and the pivot subassembly 146 are located within the stepped portion 49 of the bottom member 42 such that the trailing arm assembly 144 does not normally extend downwardly beyond the flat lower extremity of the bottom skin 42. Thus, the trailing arm assembly 144 is protected from contact with upwardly extending projections in the terrain and from entanglement with underbrush, etc. In addition, a substantially smooth bottom surface is defined when the vehicle 10 is in the water, thus reducing resistance to movement. Since the arms 132 are located within stepped portion 47, the previous comments are equally applicable thereto.

A coil spring member 150 has one end located in a spring seat on the trailing arm assembly 144 proximate the rearward end thereof and has its opposite end located in an upper spring seat member 152 located in the stepped portion 47 of bottom skin 42 and which is secured to one of the leg portions 16 and to the bottom surface of the bottom skin member 42. A shock absorber member 154 has one end attached to the trailing arm assembly 144 proximate to spring 150 and has its opposite end attached to the bracket 152 for reacting shock loads applied to the wheel assembly 138. Thus, in the rear suspension assembly, all of the suspension components react their loads through brackets or reinforcing members which are secured to the frame assembly 12.

Since the vehicle 10 is designed for use either on land or water, the differential 130 is provided with a disc brake assembly 156 located within compartment 34 for braking the rear wheels 140. Since the disc brake assembly 156 is located within compartment 34 the problem of maintaining the brakes dry is alleviated. The details of construction of a disc brake assembly operative with a differential are well known in the art and in no way constitute a part of the present invention.

The transmission and rear axle assembly 126 is powered by the engine 124 by means of a conventional drive shaft assembly 160 which has universal joints at its opposite ends. The drive shaft assembly 160 is located substantially in a longitudinally, vertically extending plane located centrally of the width or along the transverse center of the vehicle and extends longitudinally through the aperture in the box member 14 of the frame assembly 12.

A transfer case 158 is operatively connected with the transmission 134 for providing power to drive the front wheels of the vehicle 10. The transfer case 158 can be chain driven and actuable by a magnetic clutch and generally of the type described in our copending United States application No. 237,009, filed November 13, 1962, and now Patent No. 3,221,574 issued December 7, 1965.

A front wheel drive shaft assembly 162 has one end connected to the transfer case 158 and extends longitudinally, forwardly therefrom. The transfer case 158 and the front wheel drive shaft assembly 162 are located to one side of the transverse center of the vehicle 10 with the front wheel drive shaft assembly 162 extending longitudinally, forwardly through openings provided in one of the rear legs 15 and in one of the front legs 13. The front wheel drive shaft assembly is of a conventional construction and is provided with universal joints at opposite ends, with the forward universal joint being connected to a front differential 164 of a front axle assembly.

The front axle differential 164 has one end of its housing attached to one of the forward legs 22 of frame assembly 12. An axle housing 166 has one end fixed to the opposite end of the housing of front differential 164 and has its opposite end fixed to the other one of the forward legs 22. Thus, the housing for the front differential 164 and the fixed axle housing 166 act as a transverse cross member for the forward legs 22. One of a pair of pivot joints 168, similar to pivot joints 136 and 143, is connected to the fixed axle housing 166 and the other is connected to the housing of the front differential 164. A pair of movable axle housing members 170 each have one end pivotally attached to one of the pivot joints 168 for up and down swinging motion. The opposite, or outer ends of members 170 are pivotally fixed to drop gear assemblies 172, which are similar in construction to the rear drop gear assemblies 142, by pivot joints 171, which are similar to rear pivot joints 143.

Front wheel assemblies 174, which are similar to the rear wheel assemblies 138, are fixed for rotation to the drop gear assemblies 172. The gears of the drop gear assemblies 172 are connected by a spindle and universal joint assembly 177 to one end of an axle shaft 175, with the universal joint being located centrally within the pivot joint 171. The axle shaft 175, which is located within housing 170, has its opposite end connected to a universal joint 173 located within pivot joint 168. Thus, axle shaft 175 is capable of both up and down and rotative motion. One of the universal joints 173 is driven directly by the front differential 164 while the other is driven by differential 164 through a fixed axle shaft 181 located in the fixed housing 166.

The front differential 164 is provided with a front disc brake assembly 165 located in front compartment 30 for braking the front wheel assemblies 174. Thus, the problem of maintaining the brake dry is alleviated. Again, the specific details of construction have not been shown since these details are well known in the art and in no way constitute a part of the present invention.

A front coil spring and shock absorber assembly 176 comprises a coil spring with a shock absorber centrally located therein and has its lower end secured to a bracket 178, which is fixed to the axle housing 170, and has its upper end secured to an upper bracket 180, which is fixed to one of the forward legs 22. Thus, the reaction loads of the spring and shock absorber assembly 176 are taken by the structural frame assembly 12.

The outer portion 183 of the pivot joint 171 is a steering knuckle having an upwardly extending arm portion 179. An upper control arm member 182 has its inboard end pivotally secured to the bracket 180 and has its outboard end connected to the arm portion 179 via a ball joint 185. Thus, the loads at the upper control arm 182 are also reacted by the structural frame assembly 12.

Struts 161 (see FIGURE 2) are connected at one end to the movable axle housings 170 and extend substantially longitudinal rearwardly and have their opposite ends connected to brackets 163 fixed to legs 13 of frame assembly 12. The struts 161 are pivoted for up and down motions and react the horizontal loads applied to front wheel assemblies 174. Thus, the front suspension loads are also applied to the frame assembly 12.

Thus, both the front and rear wheel assemblies 174 and 138, respectively, are drivable wheels and both the front and rear suspensions are independent type suspensions. The drop gear assemblies 142 and 172 allow greater ground clearance without increasing the diameter of the wheels of assemblies 138 and 174; they also provide an additional gear reduction and hence serve as a torque multiplier.

A flexible water-tight seal is provided between the arms 132 and the leg portions 16 to seal the rear compartment 34. Water-tight seals are also provided between front differential 164 and fixed axle housing 166 to seal the forward compartment 30. The pivot joints 136 and 143 as well as the drop gear assemblies 142 are all sealed to thereby seal the internal portions of the rear axle subassembly 128. Likewise, the pivot joints 168 and 171 and drop gear assemblies 172 are all sealed to seal the front axle assembly.

Unlike the rear wheel assemblies 138, the front wheel assemblies 174 are steerable. A steering wheel 184 proximate the driver's seat in the front section 26 is connected via a universal joint 186 and steering tubes 187 and 189 to a steering gear assembly 188 which can be of a conventional construction and the details of which do not constitute a part of this invention. The broken tube construction, including tubes 187 and 189 and U-joint 186 permits the steering wheel 184 and hence the driver to be located more forwardly of the vehicle 10 than if a straight steering tube were used.

The steering gear 188 has an output shaft to which is connected a steering linkage assembly 194 which includes Pitman arm, drag link, bell crank, tie rod, center link, connecting links, etc. The steering linkage assembly 194 is in turn connected to each of the steering knuckles 183 to provide rotation of the front wheel assemblies 174 for steering the vehicle 10. The steering gear assembly 188 is fixed to one of the legs 22 whereby the steering loads are reacted by the frame assembly 12.

The gear assembly 188 is located outside of any of the enclosed compartments of the vehicle 10 and is enclosed within a fluid tight housing. The steering tube 189 extends through the bottom member 42 and is appropriately sealed to prevent the passage of water therethrough. The steering linkage assembly 194 includes a center link 196 which extends from the driver's side of the vehicle 10 to the opposite side to interconnect the two wheel assemblies 174. The center link 196 extends through the upwardly extending portions 23 of the frame assembly 12 and hence seals are provided therebetween to prevent water from entering the compartment 30.

The steering and front suspension components are substantially located within the confines of the front wheel housings 46 and normally do not extend below the lower extremity of the bottom member 42. Thus, these components are protected from contact with the terrain, etc., and do not impede movement of the vehicle 10 in the water.

In each side compartment 36 is located a gas tank 200, each of which is interconnected with the other by means of an interconnecting tube 202. A filler tube 204 extends from one of the tanks 200 to one side of the vehicle 10 to allow filling. Conventional pump means (not shown) is used to supply the fuel through appropriate fuel lines (not shown) from the tanks 200 to the engine 124. The tanks 200 are identical and are located substantially centrally longitudinally relative to the center of gravity of the vehicle 10 and on opposite sides of and substantially equidistantly from its transverse center. Since the tanks 200 are interconnected, they will always both be substantially at the same level; thus, the weight balance, both transversely and fore and aft, of the vehicle 10 will substantially remain unaltered whether the tanks 200 be empty or filled, thereby not affecting the levelness of the vehicle 10 whether it be on land or in the water.

A radiator 206 for engine 124 is located in the front compartment 30 proximate to the grill 56 and in front of engine 124. A fan 208 is driven by the engine 124 in a conventional manner and draws air through the grill 56 over the radiator 206 to cool the engine 124. The intermediate cross member 20 is provided with an aperture 209 whereby the air drawn into compartment 30 can exit therefrom and into the intermediate compartment 32. Similarly, apertures 210 in the front leg members 13 and the aperture through the box member 14 permit the air circulated from the front compartment 30 and into the intermediate compartment 32 to be moved into the side compartments 36 and into the rear compartment 34. Apertures 212 are provided in the rear legs 15 whereby the air in the side compartment 36 can be moved into the rear compartment 34. Apertures 214 are provided in both leg portions 16 whereby the air in the compartment 34 can be moved outwardly therefrom into the rear side compartments 37. Apertures 216 in the rear cross member 18 permit the air in the rear side compartments 37 to be moved therefrom into the space 217 between the rear cross member 18 and the rear panel 61. Apertures 218 communicate the space 217 with the passageway 77. Grill members 220 are located on the outer side of panels 60 near the top and communicate the passageway 77 with the atmosphere. Thus, cooling air is drawn through the grill 56 at the front of the vehicle 10 over the radiator 206 to cool the engine 124; this air also is circulated over and cools the forward disc brake 165 and the front differential 164; this air also is circulated over and cools the transmission 134, the rear differential 130, the transfer case 158 and the rear disc brake 156 and is finally exhausted at the rear of vehicle 10. Note that since the floor member 94 substantially encloses these compartments, these compartments are not only cooled but are maintained substantially dry by the circulating air thereby retarding any tendency for corrosion.

The openings 210 and 212 are also used to permit the front drive shaft assembly 162 to extend from the transfer case 158 to the front differential 164.

A battery member 222 is located in one of the compartments 68 in one side of the vehicle with appropriate connections (not shown) being made to the ignition, starting and lighting systems (not shown) of the vehicle 10. A muffler 224 has an exhaust pipe connected to the exhaust manifold of the engine 124 in a conventional manner and has a tailpipe extending rearwardly therefrom and terminating at the rear of the vehicle 10.

With the vehicle 10 described above, a balanced weight distribution is obtained fore and aft by locating the engine 124 in the front and the transmission and axle assembly 126 in the rear. As noted before, the vehicle is substantially equally balanced on opposite transverse sides of the longitudinal axis. Note also, that with the compartments and associated access doors, the components of the vehicle are readily accessible and the vehicle is capable of maximum storage of equipment and materials. The provision of side gates 62 and the tailgate 76 facilitates loading and unloading of the rear section 28 of the vehicle 10. By using a unitized construction having a centrally located load carrying structural assembly 12 and by providing the rest of the material to be made of light gauge sheet metal, the vehicle 10 is lightweight.

Means, including a propeller could be provided to be operated from the rear differential 130 whereby the vehicle 10 could be propelled in the water. It has been found, however, that considerable propulsion can be obtained by the rotation of the rear wheels. A power take off could be provided with the front differential 164 whereby a winch or other type apparatus could be driven.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A body assembly for a vehicle comprising: an outer shell assembly, said outer shell assembly including a bottom member; means including said bottom member defining compartments; a floor assembly spaced from said bottom member and extending generally the full width and for a substantial portion of the length of the vehicle to substantially close said compartments; and means defining a ventilating passageway through said compartments.

2. The body assembly of claim 1 with said plurality of compartments including a compartment for housing the brakes of the vehicle.

3. The body assembly of claim 1 with said plurality of compartments including a compartment for housing the transmission of the vehicle.

4. A body assembly for a vehicle comprising: an outer shell assembly, said outer shell assembly including a bottom member; means including said bottom member defining a plurality of compartments including an engine compartment; means including a floor assembly spaced from said bottom member to substantially close said plurality of compartments; and means defining a ventilating passageway through said plurality of compartments.

5. A body assembly for a wheeled vehicle comprising: a longitudinally extending outer shell assembly defining a front and a rear end, said outer shell assembly including a bottom member; means including said bottom member defining a plurality of compartments; a floor assembly spaced from said bottom member and extending generally the full width and for a substantial portion of the length of the vehicle to substantially close said plurality of compartments; and means defining a ventilating passageway through said plurality of compartments and including an inlet at one of said ends.

6. A body assembly for a wheeled amphibious vehicle comprising: a longitudially extending floatable outer shell assembly, said outer shell assembly including a bottom member; means including said bottom member defining a plurality of compartments for housing an engine, transmission, brakes, and front and rear differentials, means including a floor assembly spaced from said bottom member to substantially close said plurality of compartments; and means defining a ventilating passageway through said plurality of compartments; said ventilating means including an inlet and an outlet whereby air entering said inlet is circulated through said plurality of compartments prior to exiting through said outlet.

7. A body assembly for a wheeled, amphibious vehicle comprising: a longitudially extending, floatable outer shell assembly, said outer shell assembly including a bottom member; means including said bottom member defining a plurality of compartments, one of said compartments located near one end of the vehicle for housing the engine, another of said compartments located near the opposite end of the vehicle for housing the transmission; means including a floor assembly spaced from said bottom member to substantially close said plurality of compartments; and means defining a ventilating passageway through said plurality of compartments.

8. A body assembly for a wheeled vehicle comprising: an outer shell assembly, said outer shell assembly including a bottom skin member; means comprising said bottom member defining a plurality of compartments; means including a floor assembly spaced from said bottom member to substantially close said plurality of compartments, said last named means further including removable means providing access to said plurality of compartments; and means defining a ventilating passageway through said plurality of compartments.

9. A body assembly for a vehicle comprising: a longitudinally extending outer shell assembly, said outer shell assembly including a bottom member generally closing the bottom of said outer shell assembly; structural means located in and fixed to said outer shell assembly and extending longitudinally of the vehicle for reinforcing said outer shell assembly, said structural means located proximate said bottom member and defining therewith a plurality of compartments; means including a floor assembly spaced from said bottom member to substantially close said plurality of compartments, said structural means including an X-shaped frame assembly disposed centrally along the transverse center of said outer shell assembly, said X-shaped frame assembly being of a heavy gauge and said outer shell assembly being of a substantially lighter gauge.

10. The body assembly of claim 9 in which said last named means further includes means providing removable covers for access to said plurality of compartments.

11. The body assembly of claim 9 in which said structural means defines a front section and a rear section and with one of said compartments disposed substantially centrally within said front section, said front section defining a seating area on each side of said one compartment.

12. A vehicle including: a body assembly comprising a longitudinally extending outer shell assembly, said outer shell assembly including a bottom member; structural means fixed to said outer shell assembly and extending longitudinally of the vehicle for strengthening said outer shell assembly; said structural means including an X-shaped frame assembly disposed centrally along the transverse center of said outer shell assembly, said frame assembly having a forward and a rear pair of diverging legs defining forward and rear compartments, respectively, with said bottom member; and means including a floor assembly spaced from said bottom member to substantially close said compartments.

13. The vehicle of claim 12 with said structural means including a transversely extending axle housing assembly.

14. The vehicle of claim 12 in which said structural means defines a plurality of compartments including said forward and rear compartments and further including an engine disposed in said front compartments, a transmission disposed in said rear compartments, and drive shaft means extending through some of said plurality of compartments for connecting said engine to said transmission.

15. The vehicle of claim 14 further including a muffler for said engine disposed in one of said plurality of compartments and a battery disposed in one of said plurality of compartments.

16. The vehicle of claim 14 with some of said plurality of compartments defining storage areas.

17. A wheeled, amphibious vehicle comprising a body assembly including: a longitudinally extending outer shell assembly, said outer shell assembly including a bottom member; structural means fixed to said outer shell assembly and extending longitudinally of the vehicle for strengthening said outer shell assembly; said structural means including an X-shaped frame assembly disposed centrally along the transverse center of said outer shell assembly, said frame assembly having a forward and a rear pair of diverging legs with one of each pair defining oppositely located side compartments with said bottom member; said side compartments being located on opposite sides of the center of gravity of the vehicle; a floor assembly spaced from said bottom member to substantially close said compartments; and a substantially identical fuel tank disposed in each of said compartments with each said fuel tank being located symmetrically with the other relative to said center of gravity and with each located substantially longitudinally centrally with respect to said center of gravity.

18. The vehicle of claim 17 further including means interconnecting each said fuel tank with the other for maintaining the level of the fuel in each substantially equal.

19. The vehicle of claim 17 with said frame assembly defining additional compartments and further including means for driving the vehicle disposed in said additional compartments and generally distributed equally fore and aft of the vehicle relative to its center of gravity, said last named means including an engine and a transmission.

References Cited by the Examiner

UNITED STATES PATENTS

| | | | |
|---|---|---|---|
| 1,287,394 | 12/1918 | Moomaw | 296—63 |
| 1,415,209 | 5/1922 | Troke | 296—63 |
| 1,428,799 | 9/1922 | Neuteboom | 180—43 |
| 2,190,551 | 2/1940 | Swallow | 280—106 X |
| 2,319,002 | 5/1943 | Kramer | 180—54 |
| 2,350,037 | 5/1944 | Hofheins et al. | 115—1 |
| 2,400,132 | 5/1946 | Porter | 115—1 |
| 2,502,061 | 3/1950 | Radford | 296—66 |
| 2,612,964 | 10/1952 | Hobbs | 180—54 |
| 2,637,592 | 5/1953 | Karlby. | |
| 2,719,044 | 9/1955 | Walter | 280—106 |
| 2,729,501 | 1/1956 | Van Doorne et al. | 296—66 |
| 2,732,902 | 1/1956 | Barenyi | 180—73 |
| 2,808,892 | 10/1957 | Walker | 180—1 |
| 2,835,506 | 5/1958 | Schilberg | 280—106 |
| 2,923,268 | 2/1960 | Fletcher et al. | 180—54 X |
| 3,100,549 | 8/1963 | Demas | 180—73 |

FOREIGN PATENTS 236,833   7/1925   Great Britain.

BENJAMIN HERSH, *Primary Examiner.*

A. HARRY LEVY, *Examiner.*

MILTON L. SMITH, *Assistant Examiner.*